United States Patent
Takahashi et al.

(10) Patent No.: US 6,819,896 B2
(45) Date of Patent: Nov. 16, 2004

(54) IMAGE READING APPARATUS WITH WIRE TWIST PREVENTING STRUCTURE AND IMAGING APPARATUS USING THE SAME

(75) Inventors: Takuji Takahashi, Kanagawa (JP); Yoshiaki Nagao, Kanagawa (JP); Sachiko Nishikino, Tochigi (JP)

(73) Assignee: Ricoh Company, Ltd., Tokyo (JP)

(*) Notice: Subject to any disclaimer, the term of this patent is extended or adjusted under 35 U.S.C. 154(b) by 1 day.

(21) Appl. No.: 10/303,866

(22) Filed: Nov. 26, 2002

(65) Prior Publication Data

US 2003/0103781 A1 Jun. 5, 2003

(30) Foreign Application Priority Data

Nov. 30, 2001 (JP) .......................................... 2001-366765

(51) Int. Cl.[7] .............................................. G03G 15/04
(52) U.S. Cl. ...................................... 399/211; 399/212
(58) Field of Search .............................. 399/88, 90, 211, 399/212, 220; 358/497

(56) References Cited

U.S. PATENT DOCUMENTS 4,710,017 A  * 12/1987  Watanabe et al. ........... 399/212
5,191,377 A     3/1993  Kagiura et al. ................ 399/90
5,991,570 A    11/1999  Haga et al. .................. 399/114
6,549,743 B2 *  4/2003  Takahashi et al. ........... 399/211

FOREIGN PATENT DOCUMENTS

| JP | 63-135931 | * | 6/1988 |
| JP | 2588605 | | 12/1996 |
| JP | 2000-32235 | | 1/2000 |
| JP | 2000-78367 | | 3/2000 |
| JP | 2001-230895 | | 8/2001 |
| JP | 2002-218177 | | 8/2002 |

* cited by examiner

Primary Examiner—Hoan Tran
(74) Attorney, Agent, or Firm—Oblon, Spivak, McClelland, Maier & Neustadt, P.C.

(57) ABSTRACT

An image reading apparatus having an optical system that moves via coated wires wherein the twisting or crisscrossing of the electric wires upon electrically connecting the optical system to the apparatus can be effectively prevented. To this end, an image reading apparatus reads the image of an original document through exposure scanning using the optical system mounted on a first carrier and a second carrier. Feeding cables with one end connected to a lamp of the first carrier and the other end connected to a regulator and a cable accommodating member that displaceably holds a portion of the feeding cables and is capable of sliding in the direction of an external force applied to the feeding cables are provided.

15 Claims, 2 Drawing Sheets

IMAGE READING APPARATUS WITH WIRE TWIST PREVENTING STRUCTURE AND IMAGING APPARATUS USING THE SAME

BACKGROUND OF THE INVENTION

1. Field of the Invention

The present invention relates to an image reading apparatus for reading the image of an original document through exposure scanning using an optical system provided with a moving carrier, and an imaging apparatus provided with said image reading apparatus.

2. Description of the Related Art

Many copying machines, facsimiles, scanners, and the like, are provided with a so-called carriage moving type image reading apparatus, which reads the image of an original document through exposure scanning by moving the carrier back and forth along the original document, the carrier accommodating a portion of the optical system. In the image reading apparatus of this type, the optical system is provided with a plurality of mirrors for emitting the reflected light from a lamp, which is the light source, or from the original document to an image sensor device such as a CCD. A feeding cable is connected to the lamp so that it can be lit, and the lamp is mounted on the carrier and moves along with the carrier. In such a structure, flexibility and durability are demanded in the feeding cable.

In response to this requirement, for example, in JP2588605B, a feeding cable implementing a printed circuit board that consists of a flexible sheet with a conductive pattern printed on its one side is proposed. However, since the sheet is an insulator, this structure will be quite costly. Also, since the sheet has to be printed before being affixed, the manufacturing process of the cable will be complicated, further raising costs. Additionally, a protective member is implemented around the outer side of the printed circuit board. This protective member has the effect of strengthening the printed circuit board; however, this also raises the cost in the manufacturing process. Also, in JP2000-32235A, an electric wire is used as the connection cable of the mobile image sensor device, and an electric wire supporting member that is formed into a post capable of being elastically deformed supports this electric wire.

In the latter invention, an electric wire is used, thereby enabling the production of the electric supply cable at a low cost. In this structure the external forces applied to the cable are absorbed through deformation of the post of the electric wire supporting member; however, this post may break in due time after repeated use.

SUMMARY OF THE INVENTION

The present invention has been developed in response to the above-described problems of the prior art, and its object is to provide an image reading apparatus having an optical system that moves by means of a conventional coated electric wire wherein the twisting or crisscrossing of the electric wire upon electrically connecting the optical system to the apparatus can be effectively prevented.

Also, another object of the present invention is to provide an imaging apparatus implementing an image reading apparatus having an optical system that moves and is provided power by means of a conventional coated electric wire wherein the twisting or crisscrossing of the electric wires upon electrically connecting the optical system to the apparatus can be effectively prevented.

To this end, the present invention first of all provides an image reading apparatus that reads the image of an original document through exposure scanning of the document using a movable optical system, the apparatus having a feeding cable with one end connected to a carrier of the optical system and the other end connected to a fixed member of the body of the apparatus; and a cable accommodating member that displaceably holds a portion of said feeding cable and is capable of sliding in response to an external force applied to said feeding cable.

Preferably, in the above image reading apparatus, the cable accommodating member is elastically deformed upon sliding in response to the external force, and is provided with an elastic piece that resets the cable accommodating member back to its original position upon the release of the external force.

Also, in the above image reading apparatus, the cable accommodating member is preferably provided with a regulating guide portion that regulates the sliding direction of the cable accommodating member affected by the elastic piece.

Additionally, in the above image reading apparatus, an upper portion of the cable accommodating member may be provided with a cover portion that can be opened and closed, wherein the upper portion and the cover portion hold the feeding cable in place.

Further, the above-mentioned regulating guide portion of the image reading apparatus may comprise a protruding guide portion protruding downward from the bottom surface of the cable accommodating member, wherein the cable accommodating member is supported by a support portion; and a guiding trench formed in the support member to receive the protruding guide member.

Secondly, the present invention provides an imaging apparatus comprising an image reading apparatus that reads the image of an original document through exposure scanning of said document using a movable optical system, provided with a feeding cable with one end connected to a carrier of the optical system and the other end connected to a fixed member of the body of the apparatus, and a cable accommodating member that displaceably holds a portion of said feeding cable and is capable of sliding in response to an external force applied to said feeding cables; and image reproduction means for reproducing an image based on the image information obtained by the image reading process of said image reading apparatus.

DESCRIPTION OF THE PREFERRED EMBODIMENTS

In the following, a description of the embodiments of the present invention is given with reference to the accompanying drawings.

Figure 1:
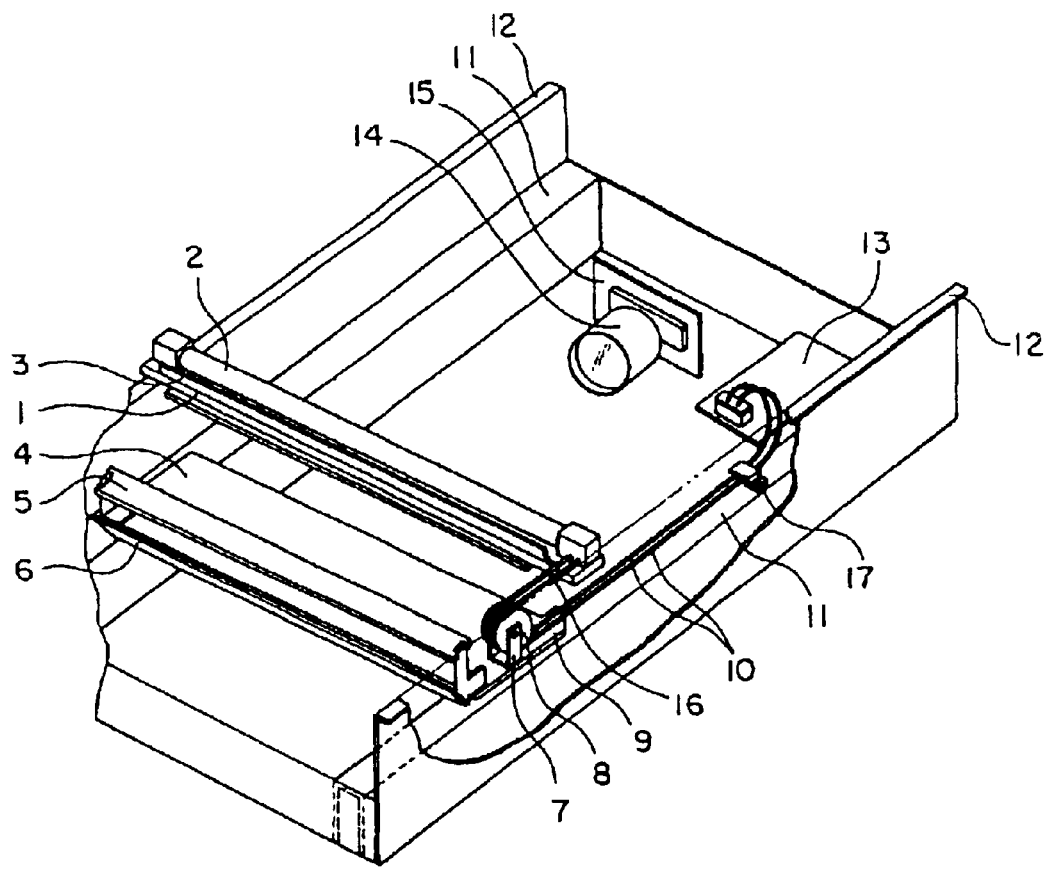
FIG. 1 shows a perspective view of the image reading apparatus according to an embodiment of the present invention for illustrating the overall structure of the apparatus, wherein a portion of the wall of the apparatus is intentionally removed in order to show its internal structure.

FIG. 1 shows a perspective view of the image reading apparatus according to an embodiment of the present invention for illustrating the overall structure of the apparatus. In this drawing, a portion of the wall of the apparatus is intentionally removed in order to show the internal structure of the apparatus. As shown, the image reading apparatus comprises a first carrier 1 that accommodates a lamp 2, which is the light source, and a first mirror 3; a second mirror 5; a third mirror 6; a rotating member 8 consisting of a pulley or the like for guiding feeding cables 10 whose one end is connected to the lamp 2; a sustaining member 7 for supporting the rotating member 8; and a second carrier 4 accommodating a guiding member 9, which guides the feeding cables 10. The first carrier 1 is sustained so as to be able to move along a first rail 12, and the second carrier 4 is sustained so as to be able to move along a second rail 11, which is located below the first rail 12. The other ends of the feeding cables 10 are connected to a regulator 13 via a cable accommodating member 17, which will be described in detail later on. Also, 14 represents a condenser lens, and 15 represents a CCD substrate, which is the imaging sensor device.

The original document from which an image is read is placed on top of a document setting platform (not shown) made of a transparent plate glass and implemented on the upper side of the apparatus. The document is irradiated by the lamp 2, after which the light reflected by the first mirror 3, the second mirror 5, and the third mirror 6, is condensed by lens 14 and then imaged onto the CCD substrate 15. The ratio of the moving speed of the first carrier 1 to the second carrier 4 is 2:1 as in the conventional image reading device, and the carriers scan the entire document while maintaining the light path at a fixed length.

Figure 2:
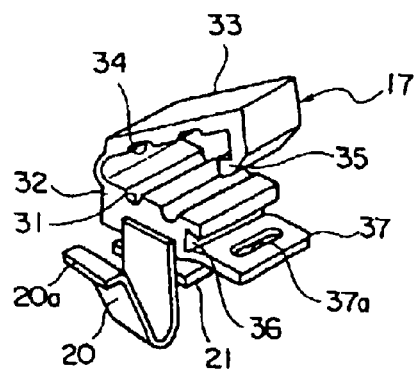
FIG. 2 is a perspective view of the cable accommodating member of FIG. 1.
Figure 3:
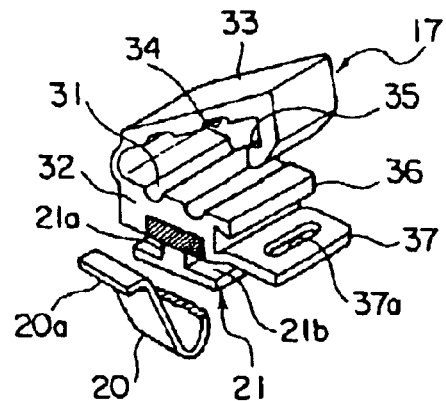
FIG. 3 is the perspective view of the cable accommodating member of FIG. 2 wherein a part of the elastic piece is removed; and, FIG. 4 is a perspective view of a portion of an engaging member for engaging the cable accommodating member.
Figure 4:
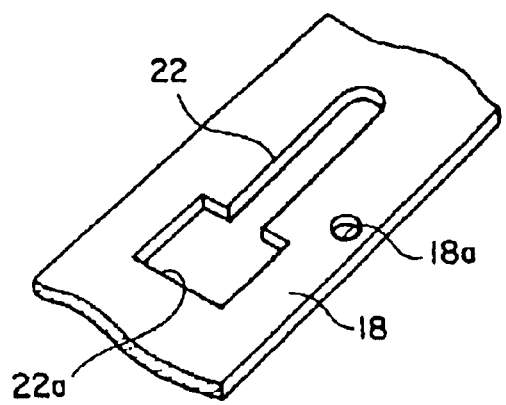

In the following, a description of the cable accommodating member 17 accommodating the feeding cable is given with reference to FIGS. 2 through 4. FIG. 2 is a perspective view of the cable accommodating member 17 by itself; FIG. 3 is the perspective view of the cable accommodating member 17 of FIG. 2 wherein a part of the elastic piece 20 is removed; and FIG. 4 is a perspective view of a portion of an engaging member for engaging the cable accommodating member 17 to the apparatus. The cable accommodating member 17 is made of synthetic resin that is capable of electric insulation, and comprises a base portion 32 having lower trenches 31 formed on its top surface for holding a plurality of feeding cables 10 in place, a cover portion 33 for fixing the feeding cables 10 by covering the base portion from the top, a protruding guide portion 21 protruding downward from the bottom surface of the base portion 32, and an elastic piece 20 located on the side of the base portion 32 that is perpendicular to the extending direction of the lower trenches 31. One side of the cover portion 33 is connected to a side of the base portion 32 that is parallel to the extending direction of the lower trenches 31, and the connecting portion is made thin so as to allow elastic bending therein. On the lower (inner) surface of the cover portion 33, upper trenches 34 that correspond to the lower trenches 31 of the base portion 32 are formed, and the feeding cables 10 are held in place by these lower trenches 31 and upper trenches 34. On the free side of the cover portion 33, a hook portion 35 is formed, and this hook portion 35 can be snapped onto a locking trench 36, which is formed on the side of the base portion 32 opposite the connecting portion of the cover portion 33 to the base portion 32. Thus, these two portions are latched together, fixing the positions of the feeding cables 10. Also, the cover portion 33 can be opened by unlatching the hook portion 35 from the locking trench portion 36.

The protruding guide portion 21 protruding from the bottom surface of the base portion 32 is provided with a locking portion 21b that extends parallel to the base portion and is distanced apart from the base portion by a support 21a. The support 21a and the locking portion 21b both extend along the extending direction of the trenches 31. The support 21a is inserted through a long guiding hole 22, which extends in the extending direction of the feeding cable 10 and is formed in the engaging portion 18 of the main body of the apparatus. The locking portion 21b comes into contact with the areas of the bottom surface of the engaging member 18 surrounding the long guiding hole 22 so that the cable accommodating member 17 will not be separated from the main body of the apparatus. The length of the long guiding hole 22 is arranged to be longer than the length of the support 21a; thus, the cable accommodating member 17 is able to move within the long guiding hole 22. At the end portion of the long guiding hole 22 extending towards the rotating member 8, a square hole 22a is formed so that the locking portion 21b can go through the hole. Thus, the locking portion 21b is inserted into the square hole 22a, and the cable accommodating member 17 can slide along the length of the long guiding hole 22 at the engaging member 18. It should be noted that the long guiding hole 22 and the square hole 22a can be implemented on the second rail 11 as shown in FIG. 1.

The elastic piece 20 is U-shaped, and one of its ends is fixed at a side of the base portion 32 that is perpendicular to the extending direction of the lower trenches 31. The U-shape portion is arranged to protrude downward and the other free end 20a of the elastic piece 20 can touch the other fixed end through elastic deformation upon being pressured (when a force is applied pushing free end 20a toward the base portion 32). The cable accommodating member 17 is engaged with the engaging member 18 by having the elastic piece 20 inserted into the square hole 22a with the free end 20a being elastically pressed to touch the fixed end of the elastic piece 20. Thus, when the pressure is released, the free end 20a is elastically latched onto the edge of the square hole 22a opposite the long guiding hole 22.

Wing member 37 is placed on top of the upper surface of the engaging member 18 upon the engagement of the cable accommodating member 17 to the engaging member 18, and this wing member 37 has a long screw hole 37a extending in the moving direction of the cable accommodating member 17. A screw (not shown) is inserted into this long screw hole 37a, and this screw is screwed into a screw hole 18a formed at the engaging member 18. In this way, the cable accommodating member 17 can be prevented from being disengaged from the square hole 22a when it is inadvertently pushed towards the rotating member 8.

By engaging the cable accommodating member 17 having the above-described structure into the square hole 22a with the free end 20a of the elastic piece 20 being pressed to the other end and releasing the pressure afterwards as described above, the free end 20a will be elastically latched to the edge of the square hole 22a opposite the long guiding hole 22 and the cable accommodating member 17 will slide towards the regulator 13 via the long guiding hole 22. The locking portion 21b of the protruding guide portion 21 touches the bottom surface of the engaging portion 18, thus preventing the cable accommodating member 17 from being disengaged. Then the hook portion 35 of the cover portion is unlatched from the locking trench 36 of the base portion 32, and the cover portion can be opened. The feeding cables 10 are placed into the lower trenches 31 of the base portion 32, and the cover portion 33 can be closed. Thus, the feeding cable 10 is fixed by the cable accommodating member 17. This process of placing the feeding cables 10 in the cable accommodating member 17 can also be performed before engaging the cable accommodating member 17 to the engaging member 18. Upon implementing the feeding cables 10 to the cable accommodating member 17, the twisting or crisscrossing of the feeding cables 10 caused by the turning of the cable accommodating member 17 can be prevented and the loosened cables can be re-straightened by the protruding guide portion 21 moving along the long guiding hole 22, thus enabling an effective implementation process of the feeding cables 10. When the feeding cables 10 are loosened during operation, the cable accommodating member 17 can move smoothly in the direction towards the rotating member 8 in proportion to the degree of the loosening, working against the elastic force of the elastic piece 20.

The imaging apparatus performs image reproduction by means of a publicly-known image reproduction method based on the image information obtained from the image reading process of the image reading apparatus having the above-described composition. For the image reproduction method itself, a publicly-known method such-as the electrophotography or ink jet method is used, and the image reproduction is performed based on the image output signals from the image processing apparatus, which performs image processing based on the image information obtained at the above-described image reading apparatus.

According to the present invention as described above, a cable accommodating member that displaceably holds a portion of the feeding cables and can slide in the direction of the external force applied to the feeding cables is provided. Also, upon implementing the feeding cable for a movable optical system, an engaging portion that is to be the cable accommodating base is provided in the middle of the feeding cable. Thus, the implementing procedures as well as the positioning (shape) of the feeding cable can be improved. Further, when an external force is applied to the cable, the cable accommodating member slides in the direction of the external force, thereby preventing the twisting or crisscrossing of the feeding cable.

What is claimed is:

1. An image reading apparatus that reads an image formed on an original document through exposure scanning of said document using a movable optical system, comprising:
   a feeding cable with one end connected to a carrier of said optical system and the other end connected to a fixed member of the body of the apparatus; and,
   a cable accommodating member that displaceably holds a portion of said feeding cable and is capable of sliding in response to an external force applied to said feeding cable.

2. The image reading apparatus as claimed in claim 1, wherein the cable accommodating member is elastically deformed upon sliding in response to said external force, and is provided with an elastic piece that resets the cable accommodating member back to its original position upon the release of said external force.

3. The image reading apparatus as claimed in claim 2, wherein the cable accommodating member has a regulating guide portion that regulates the sliding direction of the cable accommodating member effected by the elastic piece.

4. The image reading apparatus as claimed in claim 2, wherein the upper portion of the cable accommodating member has a cover portion that can be opened and closed, and said upper portion and said cover portion hold the feeding cable in place.

5. The image reading apparatus as claimed in claim 1, wherein the cable accommodating member has a regulating guide portion that regulates the sliding direction of the cable accommodating member effected by an elastic piece.

6. The image reading apparatus as claimed in claim 5, wherein the upper portion of the cable accommodating member has a cover portion that can be opened and closed, and said upper portion and said cover portion hold the feeding cable in place.

7. The image reading apparatus as claimed in claim 5, wherein the cable accommodating member is supported by a support portion, and the regulating guide portion comprises a protruding guide portion protruding downward from the bottom surface of the cable accommodating member, and a guiding trench formed in the support portion to receive the protruding guide portion.

8. The image reading apparatus as claimed in claim 1, wherein an upper portion of the cable accommodating member has a cover portion that can be opened and closed, and said upper portion and said cover portion hold the feeding cable in place.

9. An image reading apparatus that reads the image of an original document through exposure scanning of said document using a movable optical system, comprising:
   means for supplying electric power to the movable optical system and electrically connecting a carrier of said optical system to a fixed member of the body of the apparatus; and,
   holding means for accommodating said electric power supplying means, and br displaceably holding a portion of said electric power supplying means, said holding means being capable of sliding in response to an external force applied to said electric power supplying means.

10. An imaging apparatus comprising:
    an image reading apparatus that reads the image of an original document through exposure scanning of said document using a movable optical system, having a feeding cable with one end connected to a carrier of said optical system and the other end connected to a fixed member of the body of the apparatus, and a cable accommodating member that displaceably holds a portion of said feeding cable and is capable of sliding in response to an external force applied to said feeding cable; and,
    an image reproduction unit that reproduces an image based on the image information obtained by the image reading process of said image reading apparatus.

11. The imaging apparatus as claimed in claim 10, wherein the cable accommodating member of the image reading apparatus is elastically deformed upon sliding in response to said external force, and is provided with an elastic piece that resets the cable accommodating member back to its original position upon the release of said external force.

12. The imaging apparatus as claimed in claim 11, wherein the cable accommodating member of the image reading apparatus is provided with a regulating guide portion that regulates the sliding direction of the cable accommodating member effected by the elastic piece.

13. The imaging apparatus as claimed in claim 12, wherein the cable accommodating member is supported by a support portion, and the regulating guide portion comprises a protruding guide portion protruding downward from the bottom surface of the cable accommodating member, and a guiding trench formed in the support portion to receive the protruding guide portion.

14. The imaging apparatus as claimed in claim 10, wherein an upper portion of the cable accommodating member has a cover portion that can be opened and closed, and said upper portion and said cover portion hold the feeding cable in place.

15. An imaging apparatus comprising:

image reading means for reading the image of an original document through exposure scanning of said document using a movable optical system, provided with means for supplying electric power to the movable optical system and electrically connecting a carrier of said optical system to a fixed member of the body of the apparatus, and holding means for accommodating said electric power supplying means, and for displaceably holding a portion of said feeding cables, said holding means being capable of sliding in response to an external force applied to said electric power supplying means; and, image reproduction means for reproducing an image based on the image information obtained by the image reading process of said image reading means.

* * * * *